(12) United States Patent
Devgan

(10) Patent No.: US 10,305,598 B2
(45) Date of Patent: May 28, 2019

(54) ISOLATION OF RF SIGNALS USING OPTICAL SINGLE SIDE BAND MODULATION COMBINED WITH OPTICAL FILTERING

(71) Applicant: The United States of America, as represented by the Secretary of the Air Force, Washington, DC (US)

(72) Inventor: Preetpaul S Devgan, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 469 days.

(21) Appl. No.: 14/951,673

(22) Filed: Nov. 25, 2015

(65) Prior Publication Data

US 2016/0080088 A1   Mar. 17, 2016

Related U.S. Application Data

(63) Continuation of application No. 14/223,035, filed on Mar. 24, 2014, now Pat. No. 9,240,842.

(51) Int. Cl.
| | | |
|---|---|---|
| *H04B 10/00* | (2013.01) | |
| *H04B 10/516* | (2013.01) | |
| *H04B 10/556* | (2013.01) | |
| *H04B 10/80* | (2013.01) | |

(52) U.S. Cl.
CPC ......... *H04B 10/5165* (2013.01); *H04B 10/00* (2013.01); *H04B 10/5563* (2013.01); *H04B 10/802* (2013.01); *H04B 2210/006* (2013.01)

(58) Field of Classification Search
USPC .................................................. 398/115–117
See application file for complete search history.

(56) References Cited

U.S. PATENT DOCUMENTS

| | | | |
|---|---|---|---|
| 5,815,803 A | 9/1998 | Ho et al. | |
| 6,313,713 B1 | 11/2001 | Ho et al. | |
| 6,525,857 B1 * | 2/2003 | Way et al. | 398/192 |
| 6,765,708 B2 * | 7/2004 | Davies | 359/238 |

(Continued)

OTHER PUBLICATIONS

A. Narashima, et al., "Tandem single sideband modulation scheme for doubling spectral efficiency of analogue signals," Electronics Letters, vol. 36, No. 13, pp. 1135-1136, Jun. 2000

(Continued)

*Primary Examiner* — Agustin Bello
(74) *Attorney, Agent, or Firm* — AFMCLO/JAZ; Charles Figer

(57) ABSTRACT

A method and apparatus for isolating an RF signal are provided. A first RF signal is received and passed to an input of a 90 degree hybrid. An output of the 90 degree hybrid is connected to a first waveguide and a second output is connected to a second waveguide of an optical modulator. A second RF signal is received and passed to an input of a second 90 degree hybrid. An output of the second 90 degree hybrid is connected to the second waveguide and a second output is connected to the first waveguide of the optical modulator. The optical modulator is biased to produce single side band optical outputs of the RF signals. The single side band optical outputs are passed to an optical notch filter to remove one of the side band outputs. The other of the side band optical outputs is converted to an electrical signal.

6 Claims, 3 Drawing Sheets

(56) References Cited

U.S. PATENT DOCUMENTS

| | | | |
|---|---|---|---|
| 6,970,655 B2* | 11/2005 | Ono et al. | 398/186 |
| 7,003,231 B2* | 2/2006 | Way et al. | 398/186 |
| 7,035,538 B2* | 4/2006 | Willner et al. | 398/29 |
| 7,133,621 B1* | 11/2006 | An | 398/185 |
| 7,206,520 B2* | 4/2007 | Way et al. | 398/186 |
| 7,515,833 B2* | 4/2009 | Way | 398/183 |
| 7,577,367 B2* | 8/2009 | Way | 398/183 |
| 7,826,751 B2 | 11/2010 | Cox et al. | |
| 7,848,660 B1* | 12/2010 | Grasso | 398/196 |
| 8,135,288 B2* | 3/2012 | Franklin | |
| 8,687,962 B2* | 4/2014 | Gottwald et al. | 398/69 |
| 2002/0030877 A1* | 3/2002 | Way et al. | 359/183 |
| 2003/0058509 A1* | 3/2003 | Webb et al. | 359/187 |
| 2006/0140643 A1* | 6/2006 | Way et al. | 398/183 |
| 2009/0263081 A1 | 10/2009 | Cox et al. | |
| 2010/0021166 A1* | 1/2010 | Way | 398/79 |

OTHER PUBLICATIONS

M. Lv, et al., "A novel scheme for simultaneous transmission of 10-Gb/s baseband and 20-GHz microwave signals in radio-over-fiber system," Proc. of SPIE vol. 7854, pp. 7854A-1-6, 2010.

* cited by examiner

ISOLATION OF RF SIGNALS USING OPTICAL SINGLE SIDE BAND MODULATION COMBINED WITH OPTICAL FILTERING

CROSS-REFERENCE TO RELATED APPLICATIONS

This application is a continuation of U.S. patent application Ser. No. 14/223,035, entitled "Isolation of RF Signals Using Optical Single Side Band Modulation Combined with Optical Filtering," filed on Mar. 24, 2014, the entirety of which is incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

Field of the Invention

The present invention generally relates to isolating RF signals and, more particularly, to isolating RF signals with optical modulation.

Description of the Related Art

For RF signals in the microwave frequency range and higher, traditional electronic techniques for isolation between RF paths have been limited. Methods have been investigated to improve the isolation by using either multiple circulators or matched pairs of circulators with antennas. Photonic techniques provide multiple advantages over electronic techniques, one of them being large instantaneous bandwidths. A photonic solution to RF isolation would allow for increased bandwidths and higher isolation over electronic techniques. The use of a bi-directional signal interface has been demonstrated using an optical modulator for transmit and receive functions. Further work has been shown to use this system with high isolating between the RF transmit and RF receive ports. One method for transporting RF signals over a photonic link involves single-side-band modulation. By using single side band modulation, a previous demonstration has shown that two different RF signals can be single side band modulated such that one signal is on the opposite side of the optical carrier than the other signal. Further demonstrations have shown multiple signals can be placed on either side of the optical carrier, as well as mixing baseband and microwave signals on either side of the carrier.

Even with the work done in this area, there is a need in the art for better methods of isolating RF signals.

SUMMARY OF THE INVENTION

Embodiments of the invention provide a method of isolating an RF signal. In these embodiments, a first RF signal may be received and passed to an input of a first 90 degree hybrid. A first output of the first 90 degree hybrid electrically may be connected to a first electrical waveguide of an optical modulator and a second output of the first 90 degree hybrid electrically may be connected to a second electrical waveguide of the optical modulator. A second RF signal may be received and passed to an input of a second 90 degree hybrid. A first output of the second 90 degree hybrid may be electrically connected to the second electrical waveguide of the optical modulator and a second output of the second 90 degree hybrid electrically may be connected to the first electrical waveguide of the optical modulator such that the second 90 degree hybrid is in a complementary configuration as compared to the first 90 degree hybrid. The optical modulator may be biased to produce single side band optical outputs of the first and second RF signals. The optical single side band optical outputs of the first and second RF signals may then be passed to an optical notch filter to remove one of the single side band optical outputs of the first and second RF signals. The remaining single side band optical output of the first and second RF signals may then be to an electrical signal.

In an exemplary implementation of the method, consistent with embodiments of the invention, a first port may be configured to receive a first RF signal and may be electrically connected to a first 90 degree hybrid. Additionally, a second port may be configured to receive a second RF signal and may also be electrically connected to a second 90 degree hybrid in a complementary configuration with respect to the first 90 degree hybrid. An optical modulator having a first and a second electrical waveguide may be optically coupled to a laser. The first and second waveguides may be DC biased to produce single side band optical outputs of the first and second RF signals. The first electrical waveguide electrically may be connected to a first output of the first 90 degree hybrid and a further electrically connected to a first output of the second 90 degree hybrid. The second electrical waveguide electrically may be connected to a second output of the first 90 degree hybrid and a further electrically connected to a second output of the second 90 degree hybrid. The optical modulator is configured to upconvert the first RF signal to an optical carrier frequency and co-propagate with an optical field of the laser and further configured to upconvert the second RF signal to the optical carrier frequency and counter-propagate with the optical field of the laser. An optical notch filter may be optically connected to the optical modulator and configured to remove one of the single side band optical outputs of the first and second RF signals. Finally, a photodetector may be optically connected to the optical notch filter and configured to convert the remaining single side band optical output of the first and second RF signals to an electrical signal.

In another exemplary implementation of the method, consistent with embodiments of the invention, RF signals simultaneously transmitted and received on a simultaneous transmit and receive antenna may be isolated. A transmit source may be configured to generate a transmitted RF signal and electrically may be connected to the simultaneous transmit and receive antenna. A first 90 degree hybrid may be electrically connected to the transmit source and configured to receive the transmitted RF signal. A second 90 degree hybrid in a complementary configuration with respect to the first 90 degree hybrid electrically may also be connected to the simultaneous transmit and receive antenna and configured to receive a received RF signal. An optical modulator having a first and a second electrical waveguide may be optically coupled to a laser. The first and second waveguides may be DC biased to produce single side band optical outputs of the transmitted and received RF signals. The first electrical waveguide may be electrically connected to a first output of the first 90 degree hybrid and a further electrically connected to a first output of the second 90 degree hybrid. The second electrical waveguide may be electrically connected to a second output of the first 90 degree hybrid and a further electrically connected to a second output of the second 90 degree hybrid. The optical modulator is configured to upconvert the transmitted RF signal to an optical carrier frequency and co-propagate the signal with an optical field of the laser and further configured to upconvert the received RF signal to the optical carrier frequency and counter-propagate the signal with the optical field of the laser. An optical notch filter may be optically connected to the optical modulator and configured to remove the single side band optical outputs of the transmitted RF signal. Finally, a photodetector may be optically connected to the optical notch filter and configured to convert the single side band optical output of the received RF signal to an electrical signal.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

Figure 1:
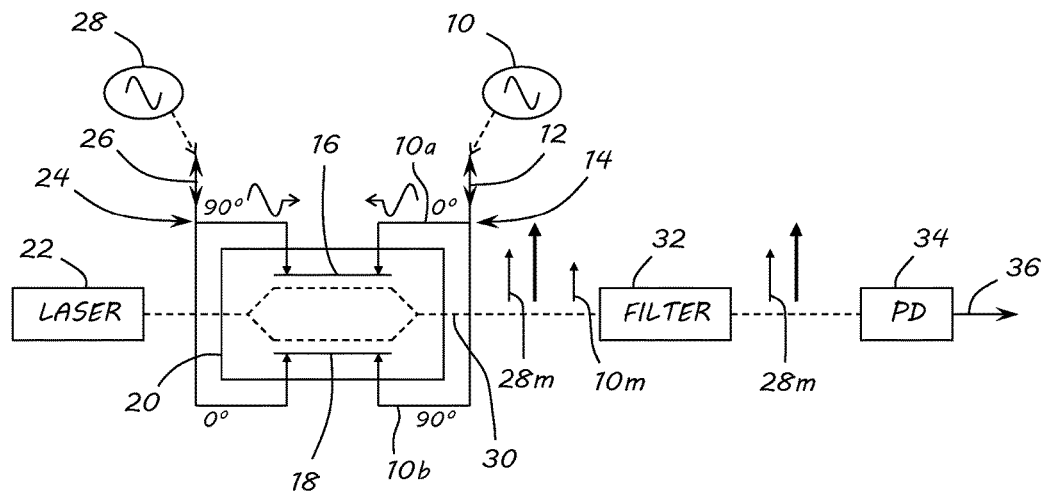
FIG. 1 is a schematic block diagram of an RF Filter consistent with embodiments of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Embodiments of the invention provide a technique to isolate RF signal travelling along a common path by utilizing optical single-side-band modulation combined with optical filtering. By utilizing this technique, RF isolation may be significantly increased between counter-propagating signals, which has utility for applications including simultaneous transmit and receive.

A mathematical description of a three port system using single side band modulation is set out below. A modulator, such as a Mach-Zehnder modulator (MZM), has a transfer function given by:

$$E_{out}(t) = \frac{1}{2}[e^{i\phi_1(t)} - e^{i\phi_2(t)}]E_{in}(t) \tag{1}$$

In the case of an RF signal entering port 2 of the three port system, a phase modulation on each arm of the MZM after a 90 degree hybrid may be written as:

$$\phi_1(t) = \phi_{dc1} + \phi_{rf1}\sin(\Omega_{rf}t) \tag{2}$$

and $$\phi_2(t) = \phi_{dc2} + \phi_{rf2}\cos(\Omega_{rf}t) \tag{3}$$

with $$\phi_{dc1,2} = \pi\left(\frac{V_{dc1,2}}{V_{\pi,dc1,2}}\right) \tag{4}$$

and $$\phi_{rf1,2} = \pi\left(\frac{V_{rf1,2}}{V_{\pi,rf1,2}(\Omega_{rf})}\right). \tag{5}$$

Now using a Jacobi-Anger expansion $$e^{iz\cos\theta} = \sum_{n=-\infty}^{\infty} i^n J_n(z) e^{in\theta} \tag{6}$$

and $$e^{iz\sin\theta} = \sum_{n=-\infty}^{\infty} J_n(z) e^{in\theta} \tag{7}$$

the following can be written:

$$E_{carrier}(t) = \frac{\overline{E}_{in} e^{i\omega_0 t}}{2}[e^{i\phi_{dc1}}J_0(\phi_{rf1}) - e^{i\phi_{dc2}}J_0(\phi_{rf2})], \tag{8}$$

$$E_{usb,fund}(t) = \frac{\overline{E}_{in} e^{i\omega_0 t - i\Omega_{rf}t}}{2}[-e^{i\phi_{dc1}}J_1(\phi_{rf1}) - ie^{i\phi_{dc2}}J_1(\phi_{rf2})], \tag{9}$$

$$E_{lsb,fund}(t) = \frac{\overline{E}_{in} e^{i\omega_0 t + i\Omega_{rf}t}}{2}[e^{i\phi_{dc1}}J_1(\phi_{rf1}) - ie^{i\phi_{dc2}}J_1(\phi_{rf2})]. \tag{10}$$

In the present case, the RF signal may be the same on both electrical waveguides so $\phi_{rf1} = \phi_{rf2}$. For the condition of single-side-band operation, there are two cases. For the upper side band to be nulled, $\phi_{dc1} = -\pi/2 + \phi_{dc2}$ and for the lower side band to be nulled, $\phi_{dc1} = \pi/2 + \phi_{dc2}$. For an RF signal input to port 1, a second 90 degree hybrid may be utilized in a complementary configuration so $\phi_1(t) = \phi_{dc1} + \phi_{rf}\cos(\Omega_{rf}t)$ and $\phi_2(t) = \phi_{dc2} + \phi_{rf2}\sin(\Omega_{rf}t)$. In this configuration, the resulting fields may be written as:

$$E_{carrier}(t) = \frac{\overline{E}_{in} e^{i\omega_0 t}}{2}[e^{i\phi_{dc1}}J_0(\phi_{rf1}) - e^{i\phi_{dc2}}J_0(\phi_{rf2})], \tag{11}$$

$$E_{usb,fund}(t) = \frac{\overline{E}_{in} e^{i\omega_0 t - i\Omega_{rf}t}}{2}[ie^{i\phi_{dc1}}J_1(\phi_{rf1}) + e^{i\phi_{dc2}}J_1(\phi_{rf2})], \tag{12}$$

$$E_{lsb,fund}(t) = \frac{\overline{E}_{in} e^{i\omega_0 t + i\Omega_{rf}t}}{2}[ie^{i\phi_{dc1}}J_1(\phi_{rf1}) - e^{i\phi_{dc2}}J_1(\phi_{rf2})]. \tag{13}$$

For a single side band condition, the upper side band may be nulled when $\phi_{dc1} = \pi/2 + \phi_{dc2}$, and the lower side band may be nulled when $\phi_{dc1}=-\pi/2+\phi_{dc2}$. Thus, it is apparent that the RF signals at port 1 and port 2 may appear on opposite sides of the optical carrier when the bias conditions are set for single side band modulation allowing the RF signals to be separated in the optical spectrum from one another. Then, by using an optical filter, one sideband may be removed while the carrier and other sideband will pass on to the photodetector to recover the RF signal at the third port.

Turning now to FIG. 1 the above configuration may be implemented in an embodiment of the invention as follows. An RF signal 10 at input port 12 is split by a 90 degree hybrid 14 onto two electrical waveguides 16, 18 in a modulator 20, such as a Mach-Zehnder modulator though other modulators or modulation techniques may also be used, with a zero degree output on waveguide 16 and a 90 degree output on waveguide 18. The RF signal 10 counter-propagates to an optical field that is input to the modulator 20 from a laser 22. The split signals 10a, 10b then pass down to another 90 degree hybrid 24 which is placed in a complementary arrangement to the hybrid 14. In this embodiment, hybrid 24 has a 90 degree input connected to waveguide 16 and a zero degree input connected to waveguide 18. Split signals 10a and 10b are then recombined and may be transmitted out a port 26.

Port 26 may also receive another RF signal 28. This RF signal 28 may be split by 90 degree hybrid 26, with a 90 degree output on waveguide 16 and a zero degree output on waveguide 18. Signal 28 will also co-propagate with the optical field of the laser 22 in the modulator 20 and counter-propagate to RF signal 10. Similarly a recombined signal 28 may be transmitted out port 12. Both RF signals 10, 28 may then be upconverted onto an optical carrier frequency of the laser 22. A DC bias may then be set for each of the electrical waveguides 16, 18 resulting in an optical output 30 that will be single side-band.

Because RF signal 10 passes through the complementary 90 degree hybrid of RF signal 28, RF signal 10m will appear on an opposite single side of the optical carrier as compared to RF signal 28m. The optical output 30 of the modulator 20 may then be passed through an optical filter 32 in order to remove an unwanted RF signal's sideband, while preserving the sideband of an RF signal of interest. Optical filter 32 may be a notch type optical filter for some embodiments, and in other embodiments, the notch filter may be a tunable optical notch filter. An output of the filter 32 is connected to a photodetector 34 where the RF signal 28 is recovered and then output at a port 36. Because the RF signal is removed by the optical filter 32 before the detector, RF isolation between port 12 and port 30 is better than utilizing electrical filters after the photodetector 34 as is common in contemporary devices.

Figure 2:
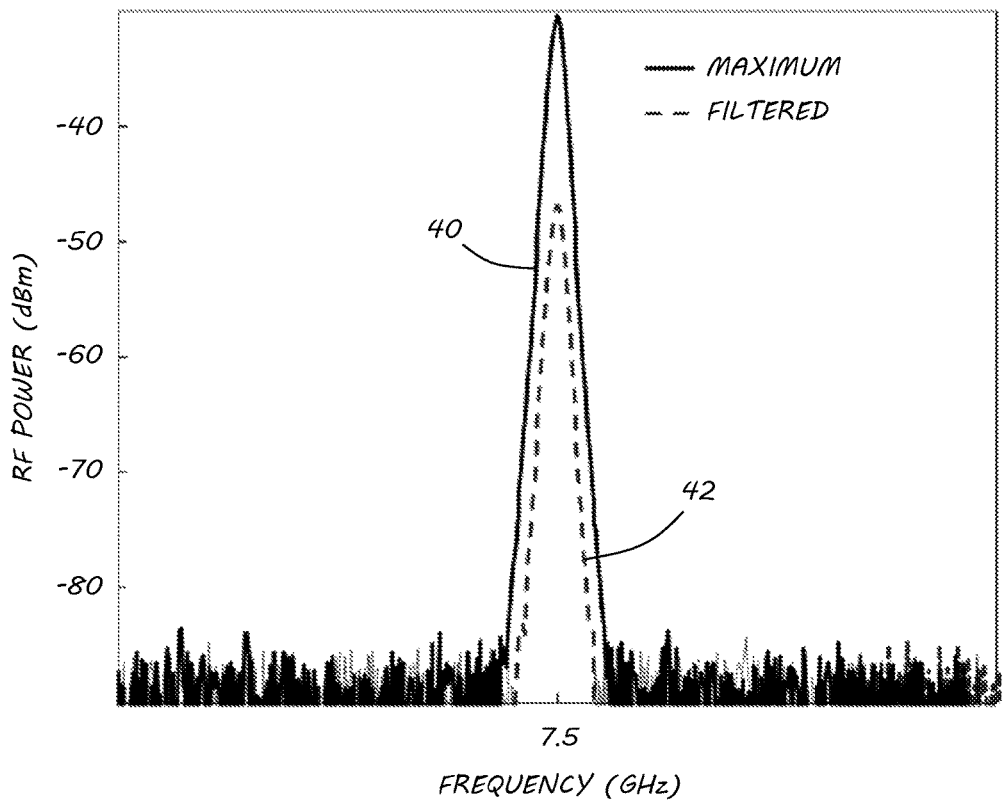
FIG. 2 is a graph showing results of a filtered signal.
Figure 3:
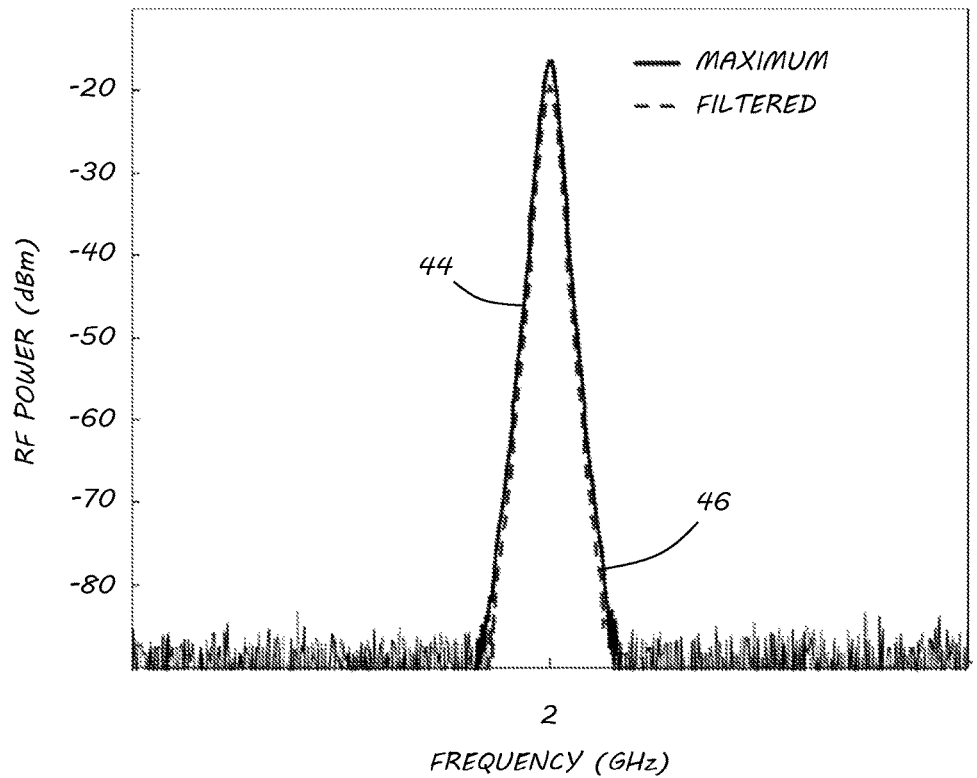
FIG. 3 is a graph showing results of an alternate filtered signal.

With the signal being removed by the optical filter before the detector, the RF isolation between port 12 and port 36 may be quite high. For example, in a measurement made with an RF signal 10 at 7.5 GHz input to port 12 and a second RF signal 28 at 2 GHz input at port 26. The modulator 20 may be biased in order to set both signals into single side band modulation on either side of the optical carrier and then the optical filter may be adjusted. The RF powers associated with RF signal 10 at port 36 for the 7.5 GHz signal 10 from port 12 are illustrated in the graph in FIG. 2. When the filter is set to maximize signal 10 from port 12, the RF power is −30 dBm as shown by curve 40. When the filter is set to extinguish the side band, shown by curve 42, the RF power is −47 dBm, which is a 17 dB extinction. The graph in FIG. 3 shows the RF power at port 36 for the 2 GHz signal 28 from port 26. When the filter is set of maximize the signal at port 26, the RF power is −16.3 dBm as shown by curve 44. When the filter is set to extinguish the other side band, the RF power is −19.3 dBm as shown by curve 46. When the input power of the two signals is taken into account, the unwanted signal, from port 12 for example, is −41 dB from the power of the input signal at port 12, taking into account the additional insertion loss of the optical filter.

Figure 4:
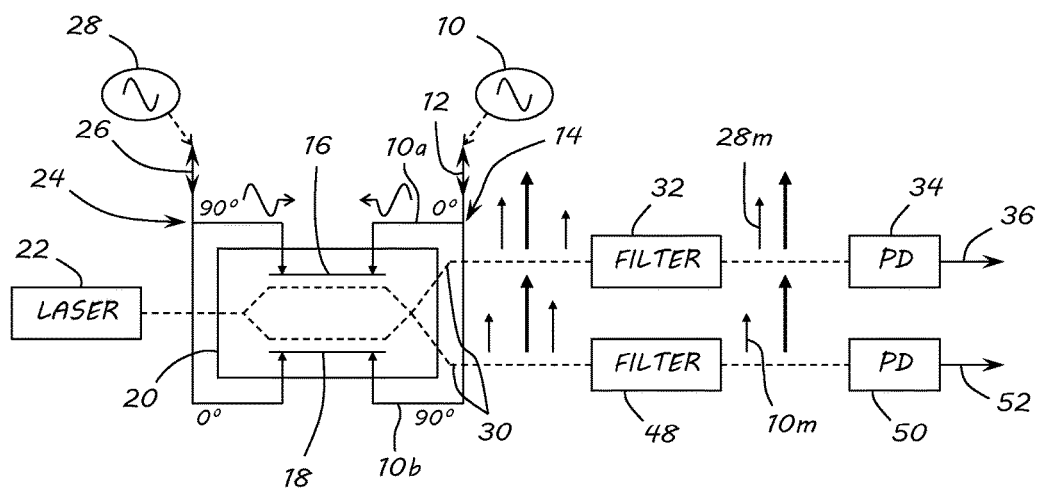
FIG. 4 is a schematic block diagram of an alternate embodiment of the RF filter of FIG. 1.

In an alternate embodiment illustrated in FIG. 4, the RF signal 10 at input port 12 is again split by the 90 degree hybrid 14 onto two electrical waveguides 16, 18 in a modulator 20 with a zero degree output on waveguide 16 and a 90 degree output on waveguide 18. The RF signal 10 counter-propagates to the optical field that is input to the modulator 20 from the laser 22. The split signals 10a, 10b then pass down to another 90 degree hybrid 24 which is placed in a complementary arrangement to the hybrid 14. Similarly, in this embodiment, hybrid 24 has the 90 degree input connected to waveguide 16 and the zero degree input connected to waveguide 18. Split signals 10a and 10b are then recombined and may be transmitted out port 26.

Similar to the embodiment described above, port 26 may also receive another RF signal 28. This RF signal 28 may be split by 90 degree hybrid 24, with a 90 degree output on waveguide 16 and a zero degree output on waveguide 18. Signal 28 will also co-propagate with the optical field of the laser 22 in the modulator 20 and counter-propagate to RF signal 10. Similarly the recombined signal 28 may be transmitted out port 12. Both RF signals 10, 28 may then be upconverted onto the optical carrier frequency of the laser 22. A DC bias may then be set for each of the electrical waveguides 16, 18 resulting in an optical output 30 that will be single sideband.

Because RF signal 10 passes through the complementary 90 degree hybrid of RF signal 28, RF signal 10m will appear on an opposite single side of the optical carrier as compared to RF signal 28m. The optical output 30 of the modulator 20 may then be split with one output connected to optical filter 32 and the other to optical filter 48. Again optical filter may be a notch type optical filter that is tuned to remove the unwanted RF signal's sideband, in this case the sideband containing signal 10m. The output of the filter 32 is then connected to the photodetector 34 where the RF signal 28 is recovered and then output at port 36. Similarly, optical filter 48 may also be a notch type optical filter that is tuned to remove the unwanted RF signal's sideband, in this case the sideband containing signal 28m. The output of the filter 48 then connected to a photodetector 50 where the RF signal 10 is recovered and then output to a port 52.

Figure 5:
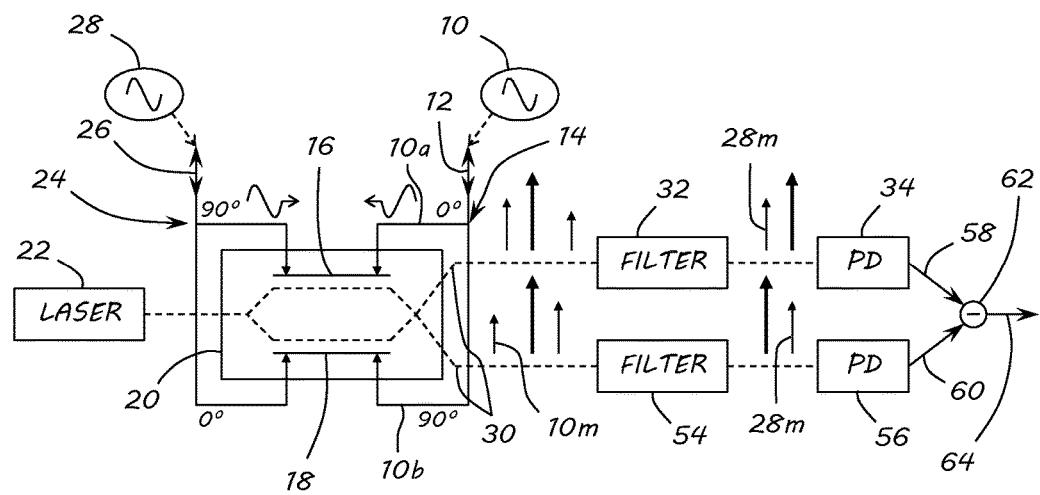
FIG. 5 is a schematic block diagram of an alternate embodiment of the RF filters of FIGS. 1 and 4.

In an alternate embodiment illustrated in FIG. 5, the RF signal 10 at input port 12 is again split by the 90 degree hybrid 14 onto two electrical waveguides 16, 18 in a modulator 20 with a zero degree output on waveguide 16 and a 90 degree output on waveguide 18. The RF signal 10 again counter-propagates to the optical field that is input to the modulator 20 from the laser 22. The split signals 10a, 10b then pass down to another 90 degree hybrid 24 which is again placed in a complementary arrangement to the hybrid 14. Similarly, in this embodiment, hybrid 24 has the 90 degree input connected to waveguide 16 and the zero degree input connected to waveguide 18. Split signals 10a and 10b are then recombined and may be transmitted out port 26.

Similar to the embodiments described above, port 26 may also receive another RF signal 28. This RF signal 28 may be split by 90 degree hybrid 26, with a 90 degree output on waveguide 16 and a zero degree output on waveguide 18. Signal 28 will also co-propagate with the optical field of the laser 22 in the modulator 20 and counter-propagate to RF signal 10. Similarly the recombined signal 28 may be transmitted out port 12. Both RF signals 10, 28 may then be upconverted onto the optical carrier frequency of the laser 22. A DC bias may then again be set for each of the electrical waveguides 16, 18 resulting in an optical output 30 that will be single sideband.

Because RF signal 10 passes through the complementary 90 degree hybrid of RF signal 28, RF signal 10*m* will appear on an opposite single side of the optical carrier as compared to RF signal 28*m*. The optical output 30 of the modulator 20 may again be split with one output connected to optical filter 32 and the other to optical filter 54. In this embodiment, the optical filters 32, 54 may be a notch type optical filters that are tuned to remove the unwanted RF signal's sideband, in this case the sideband containing signal 10*m*. The output of the filter 32 is then connected to the photodetector 34 where the RF signal 28 is recovered and then output at 58. Similarly, the output of the filter 56 then connected to a photodetector 56 where again the RF signal 28 is recovered and then output at 60. Then using balanced photodetection of the photodetectors 34, 56, the signals may be combined at 62 and output to a port 64. Combination of the same signals at port 64 may assist in achieving better performance and a stronger filtered signal.

Figure 6:
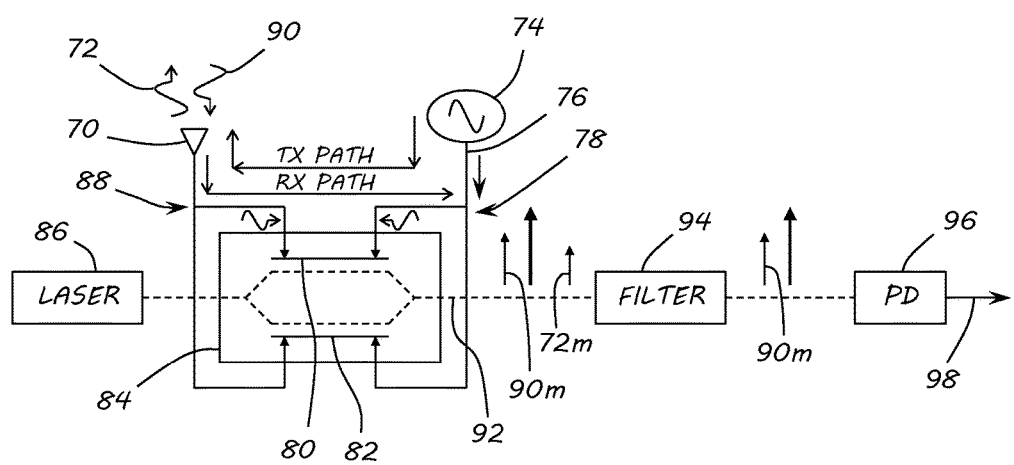
FIG. 6 is a schematic block diagram of an alternate embodiment of the RF filters of FIGS. 1, 4, and 5.

FIG. 6 illustrates an embodiment of the invention used in a practical application utilizing a simultaneous transmit and receive (STAR) antenna 70. An RF transmit signal 72 originating from a transmission source 74 may be received at port 76 and split by a 90 degree hybrid 78 onto two electrical waveguides 80, 82 in a modulator 84 with a zero degree output on waveguide 80 and a 90 degree output on waveguide 82. The transmit RF signal 72 again counter-propagates to the optical field that is input to the modulator 84 from a laser 86. The split signals then pass down to another 90 degree hybrid 88 placed in a complementary arrangement to the hybrid 78. In this embodiment, hybrid 88 has the 90 degree input connected to waveguide 80 and the zero degree input connected to waveguide 82. The split signals are then recombined and may be transmitted out port the antenna 70.

The antenna may simultaneously receive RF signal 90. The transmitted and received signals 72, 90 may be at the same frequency in some of the embodiments. This received RF signal 90 may also be split by 90 degree hybrid 88, with the 90 degree output on waveguide 80 and a zero degree output on waveguide 82. Both the transmitted and received RF signals 72, 90 may then be upconverted onto the optical carrier frequency of the laser 86. A DC bias may then be set for each of the electrical waveguides 80, 82 resulting in an optical output 92 that will be single side-band with the transmitted RF signal 72*m* will appear on an opposite single side of the optical carrier as compared to the received RF signal 90*m*. The optical output 92 of the modulator 84 is connected to optical filter 94, which is a notch type optical filter tuned to remove the sideband containing the transmitted signal 72*m*. The output of the filter 94 is then connected to a photodetector 96 where the received RF signal 90 is recovered and then output at a port 98.

This method and apparatus provides much better isolation between two RF signals that are counter-propagating along the same path than is provided by contemporary electronic methods. The larger isolation makes it easier for applications such as simultaneous transmit and receive to be realized. The photonic system also provides much larger instantaneous bandwidth (>20 GHz) than that of contemporary electronic methods. By using a photonic link for the RF path between input and output ports, the output port is also isolated from any damaging RF powers such as from a direct lightning strike or other sources. While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of isolating an RF signal, the method comprising:

receiving a first RF signal;

passing the first RF signal to an input of a first 90 degree hybrid, a first output of the first 90 degree hybrid electrically connected to a first electrical waveguide of an optical modulator and a second output of the first 90 degree hybrid electrically connected to a second electrical waveguide of the optical modulator;

receiving a second RF signal;

passing the second RF signal to an input of a second 90 degree hybrid in a complementary configuration with respect to the first 90 degree hybrid, a first output of the second 90 degree hybrid electrically connected to the second electrical waveguide of the optical modulator and a second output of the second 90 degree hybrid electrically connected to the first electrical waveguide of the optical modulator;

biasing the optical modulator to produce single side band optical outputs of the first RF signal to co-propagate with an optical field of the optical modulator and the second RF signal to counter-propagate with the optical field of the optical modulator;

passing the optical single side band optical outputs of the first and second RF signals to an optical notch filter to remove one of the single side band optical outputs of the first and second RF signals; and converting the other of the single side band optical outputs of the first and second RF signals to an electrical signal.

2. The method of claim 1, wherein biasing the optical modulator results in the single side band optical output of the first RF signal and the single side band optical output of the second RF signal on opposite sides of an optical carrier frequency.

3. The method of claim 1, wherein removing one of the single side band optical outputs of the first and second RF signals comprises:

tuning the optical notch filter to the one of the single side band optical outputs of the first and second RF signals.

4. A method for isolating RF signals in a system including a first port, a first 90 degree hybrid electrically connected to the first port, a second port, a second 90 degree hybrid in a complementary configuration with respect to the first 90 degree hybrid electrically connected to the second port, a laser, an optical modulator optically coupled to the laser and having a first and a second electrical waveguide, the first electrical waveguide electrically connected to a first output of the first 90 degree hybrid and a further electrically connected to a first output of the second 90 degree hybrid, the second electrical waveguide electrically connected to a second output of the first 90 degree hybrid and a further electrically connected to a second output of the second 90 degree hybrid, an optical notch filter optically connected to the optical modulator, and a photodetector optically connected to the optical notch filter, the method comprising:

receiving a first RF signal at a first port;

receiving a second RF signal at a second port;

DC biasing the first and second waveguides to produce single side band optical outputs of the first and second RF signals on opposite sides of an optical carrier frequency;

upconverting the received first RF signal to the optical carrier frequency with the optical modulator to create a single side band optical output of the first RF signal and co-propagate the optical output of the first RF signal with an optical field of the laser;

upconverting the received second RF signal to the optical carrier frequency with the optical modulator to create a single side band optical output of the second RF signal and counter-propagate the optical output of the second RF signal with the optical field of the laser;

removing one of the single side band optical outputs of the first and second RF signals with the optical notch filter; and converting the other of the single side band optical outputs of the first and second RF signals to an electrical signal by the photodetector.

5. The method of claim 4, wherein the optical notch filter of the system is a first optical notch filter and the photodetector of the system is a first photodetector, the system further including a second optical notch filter optically connected to the optical modulator and a second photodetector optically connected to the second optical notch filter, the method further comprising:

removing the one of the single side band optical outputs of the first and second RF signals with the second optical notch filter; and converting the one of the single side band optical outputs of the first and second RF signals to an electrical signal with the second photodetector.

6. The method of claim 4, wherein the optical notch filter of the system is a first optical notch filter and the photodetector of the system is a first photodetector, the system further including a second optical notch filter optically connected to the optical modulator, a second photodetector optically connected to the second optical notch filter and a combiner electrically coupled to the first photodetector and the second photodetector, the method further comprising:

balancing outputs of the first and second photodetectors;

removing the one of the single side band optical outputs of the first and second RF signals with the second notch filter;

converting the other of the single side band optical outputs of the first and second RF signals to an electrical signal with the second photodetector; and combining the converted single side band optical outputs from the first and second photodetector with the combiner.

* * * * *